Feb. 26, 1957 W. D. KILLINGSWORTH 2,783,319
SAFETY DEVICES FOR DEEP WELL PUMP DRIVE SHAFTS
Filed May 17, 1955 2 Sheets-Sheet 1
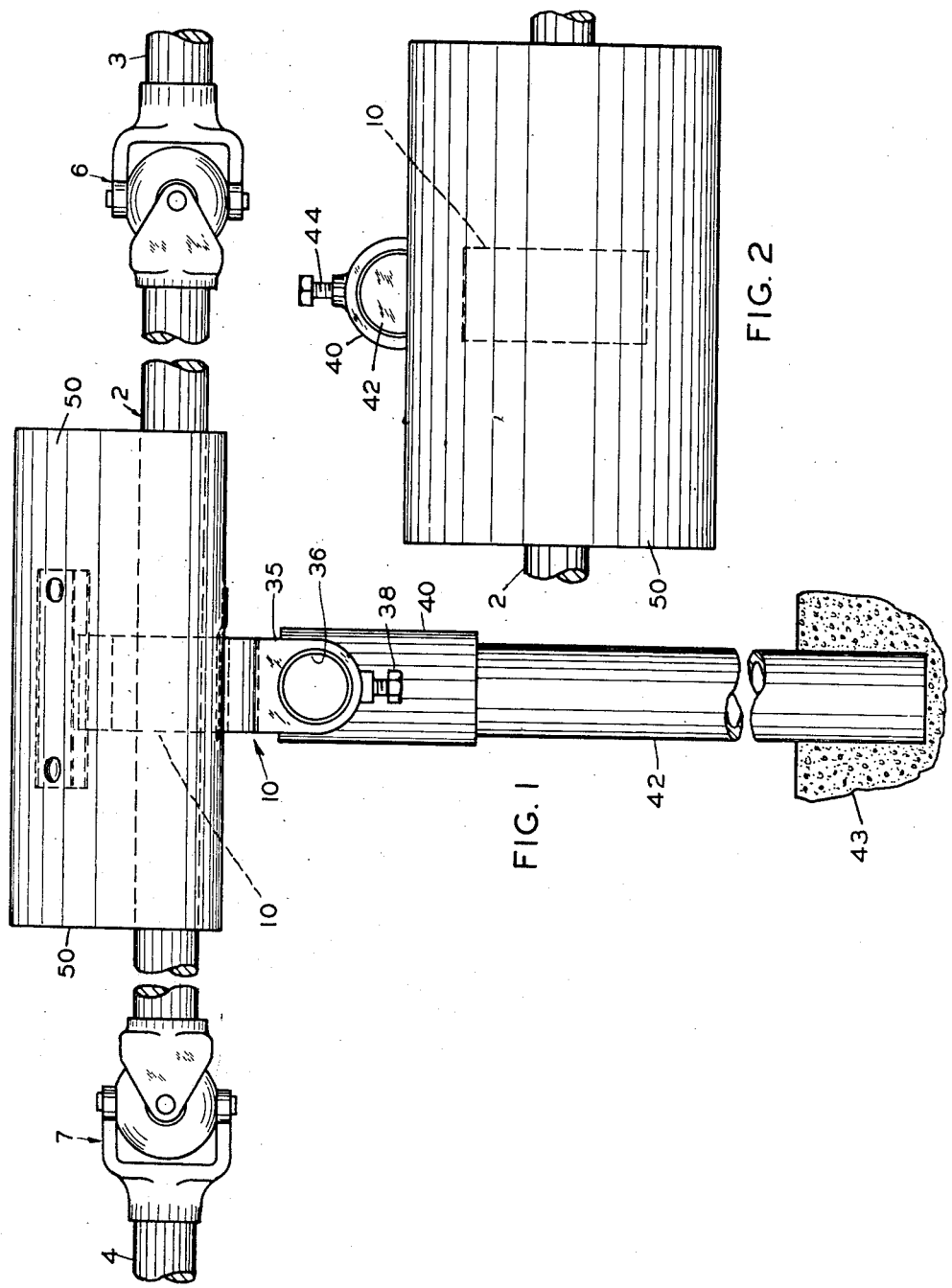
INVENTOR.
William D. Killingsworth
BY

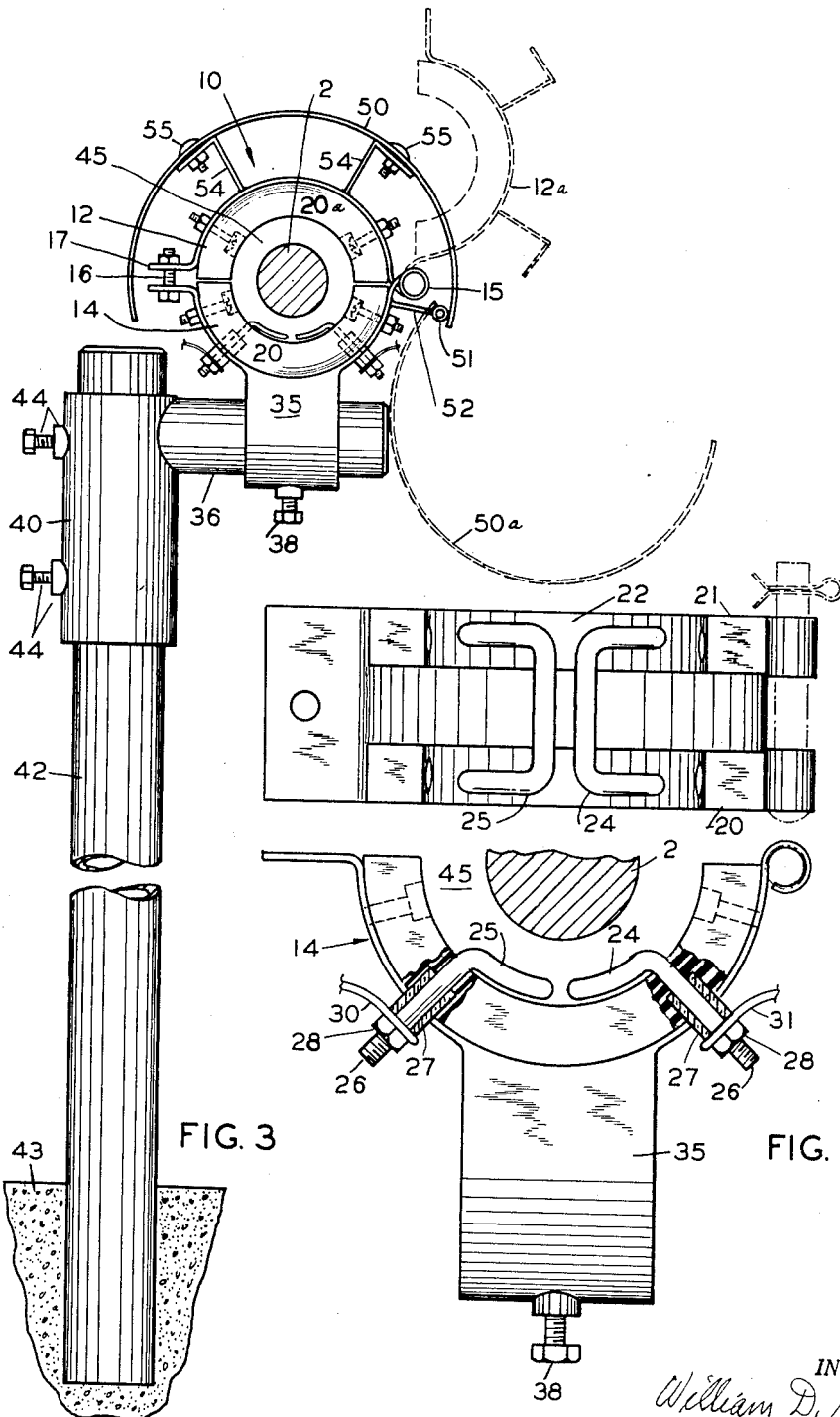

United States Patent Office 2,783,319
Patented Feb. 26, 1957

2,783,319

SAFETY DEVICES FOR DEEP WELL PUMP DRIVE SHAFTS

William D. Killingsworth, Casa Grande, Ariz.

Application May 17, 1955, Serial No. 508,934

3 Claims. (Cl. 200—52)

This invention concerns safety devices for deep well pump drive shafts.

More particularly the device concerns drive shafts which connect the horizontal shafts of internal combustion pump engines to the gear head of a deep well pump.

The drive shafts here concerned transmit considerable power, and due to the fact that the pump head gear and case is mounted on a foundation around the wheel and the engine is mounted on a separate foundation at some distance therefrom, it is necessary to use a shaft with universal joints at each end to connect the engine shaft to the horizontal stub shaft of the pump gear head casing. It is impossible to maintain these two shafts fully aligned, and is, therefore, necessary to allow for both horizontal and vertical misalignment.

Due to the heavy loads carried by the shaft and the fact that the load is apt to surge and put unexpected strains on the shaft, failure of the shaft is quite possible under ordinary running conditions. It is to be understood that the engine, whether diesel operated, or used with natural gas as a fuel, is controlled by a governor and once adjustments are made the operation of the pump is considered to be automatic for long periods of time.

A failure of the drive shaft where no operator is present can cause serious and expensive injury to both the engine and the pump head as well as other attendant parts of the machinery. Failure usually takes place in one or both of the universal joints and when this happens the loose end of the broken shaft swings around the remaining part of the shaft attached to the engine and causes serious damage before the engine can be stopped. Heretofore, there has been no means for stopping the engine when the shaft breaks or when any other failure happens to the running gear.

In view of the foregoing, one of the objects of this invention is to provide an emergency bearing which will hold the shaft in substantially aligned relation to the engine shaft and/or the pump shaft in case there is a breakage of the shaft itself or of either universal joint.

Another object is to provide an emergency bearing which does not normally bear on the shaft, but which will act as a bearing whenever the universal joints at each end of the shaft break or any of their attendant parts shear off so that the shaft is left without its normal support on the engine and pump shafts.

A third object of the invention is to provide a safety emergency bearing or bearings as above stated with an electrical switch which may be connected to the ignition or ignition apparatus of the engine and which will immediately stop the engine whenever misalignment of the shaft causes the emergency bearing to become operative.

Other objects will appear hereinafter.

I attain the foregoing objects by means of the devices, structures, parts, and combinations of parts shown in the accompanying drawings in which—

Figure 1 is a side elevation of a pump shaft provided with my safety emergency bearing and engine shut off switch;

Figure 2 is a general plan view thereof;

Figure 3 is an end view of the drive shaft and emergency bearing;

Figure 4 is a partial side elevational view of the lower half of my emergency bearing; and Figure 5 is a plan view thereof.

Similar numerals refer to similar parts in the several views.

In general, numeral 2 indicates the connecting drive shaft which connects engine shaft 3 to the pump head shaft 4. Universal joint 6 connects the engine shaft to the adjacent end of the shaft 2 and universal joint 7 connects the pump shaft 4 to the adjacent end of shaft 2.

At substantially the middle of drive shaft 2 I position the safety emergency bearing generally indicated by numeral 10. This consists of an upper part 12 and a lower part 14; these parts being hinged together at 15 and provided with a bolt 16 and lugs 17 to clamp the opposite sides together. It is to be noted that the upper and lower parts of the emergency bearing are semicircular in shape. Within these parts there are liners indicated by numerals 20, 21, 20a and 21a, which are made of nonbreakable insulating material, such as Formica or a resinous plastic composition.

On the inner arcuate faces 22 of the bottom insulating bearing liners 20 and 21 there are arcuate shaped metal electrical conductors 24 and 25. These conductors are insulated from all metal parts of the bearing and are bent so that their ends 26 pass radially outward through the lower bearing part 14 through insulating sleeves 27, and are threaded to receive nuts 28. The conductors are arcuately shaped and are positioned so that whenever shaft 2 breaks or becomes misaligned and contacts the inner surface of the safety bearing, the conductors are also immediately contacted and grounded by and through shaft 2. Wires 30 and 31 connect each of the contactors to the electrical system of the ignition mechanism of the engine. If this electrical mechanism is a magneto then the wires connect to the grounding terminal provided in the magneto. If the ignition is a battery operated system, the wires are so connected that they ground out the primary of the induction coil. In case the engine is full diesel the grounding of the wires closes a circuit which will operate a solenoid valve which will, in turn, shut off the fuel, or render the fuel injectors inoperative.

The emergency bearing 10 is supported on a lug 35 which has a circular opening transverse to shaft 2 to accept arm 36. A set screw 38 adjustably positions the lug on this arm.

Arm 36 is attached to vertical sleeve 40 which has an opening to slidably receive vertical post 42. This post is set in a concrete footing 43 poured in the earth about midway between the engine and the pump or below the middle of shaft 2. Set screws 44 adjustably position sleeve 40 on post 42. By means of the several adjustments the bearing 10 can be accurately positioned vertically and transversely so that the liners 20, 21, 20a, and 21a are concentric relative to shaft 2 and provide an annular air gap 45 between the adjustment surfaces. Normally shaft 2 does not bear on or contact the inner curved surfaces of the liners, nor does it contact the electrical conductors 24 and 25.

As an additional safety element I provide an arcuately shaped shield 50 which is hinged on one side edge at 51 to the outer end of radial strut 52 which has its inner end welded to lower bearing part 14. Struts 54 are spaced at annular intervals and welded at their inner ends to bearing part 12. These struts extend radially outward and are removably attached to shield 50 by bolts 55. When desired these bolts may be removed and the shield swung down to the position indicated by dotted outlines 50a. The top part 12 of the bearing 10 may then be hinged to the position shown by dotted lines 12a, and shaft removed or replaced, as desired.

In use, after the erection of post 42, the bearing 10 is hinged to the open position with the top part hinged outward, as at 12a, and shield 50 hinged open, as at 50a. Shaft 2 is then placed in operating position and the top and shield closed, as shown in solid lines, Figure 3. The bearing is then adjusted by sleeve 40 and lug 35 so that it is concentric with the shaft, as shown. The conductors are then connected to the engine ignition system, and the engine started and operated in the usual manner.

Should the shaft break, or either universal joint fail, the shaft 2 will not whip around but will be confined in its rotation by bearing 10 to a position substantially aligned with its correct running position, and at the same time it will contact and ground either or both conductors and stop the engine.

During normal operation the bearing and shaft are substantially enclosed by shield 50.

I claim:

1. An emergency drive shaft bearing and engine cut off switch, for supporting a free running horizontal drive shaft operating between an engine and a pump head in case of breakage, consisting of a cylindrical bearing body having an arcuate lower part and an arcuate upper part hinged together along one side, and removably attached on the opposite side, axially spaced rings of insulating material having circular inner faces of a larger diameter than said drive shaft, each composed of semi-circular portions fitted into the upper and lower parts, respectively, of said bearing body, arcuate conductors attached to the inner faces of the lower portions of said semi-circular insulating portions, adapted to be connected to the grounding connectors of said engine ignition system and to make ground contact on said shaft in case of breakage, and supporting means for said bearing body including vertically and horizontally adjustable elements, said bearing rings being normally out of contact with said drive shaft and adapted to act as a temporary bearing for said shaft in case of breakage thereof.

2. An emergency drive shaft bearing and engine cut off switch, for temporarily supporting a horizontal drive shaft supported at each end by universal joints and operating between an engine and a pump head in case of breakage, consisting of a cylindrical bearing body having an arcuate lower part and an arcuate upper part hinged together along one side, and removably joined on the opposite side, parallel rings of insulating material having circular inner faces of a larger diameter than said drive shaft, each composed of semi-circular portions fitted into the upper and lower parts, respectively, of said bearing body, arcuate conductors attached to the inner faces of the lower portions of said semi-circular insulating portions, adapted to be connected to the grounding connectors of said engine ignition system and to make ground contact on said shaft in case of breakage, and supporting means for said bearing body including vertically and horizontally adjustable elements, holding said body so that the inner faces of said semi-circular insulating portions of said bearing body are normally out of contact with said shaft, but are adapted to act as temporary bearings in case of the breakage of said shaft or said universal joints, and an arcuate safety shield supported on the upper part of said bearing body, in spaced relation therewith and extending longitudinally over said bearing and shaft.

3. An emergency drive shaft bearing and engine cut off switch, for supporting a horizontal drive shaft supported at each end by universal joints and operating between an engine and a pump head, in case of breakage, consisting of a cylindrical bearing body having an arcuate lower part and an arcuate upper part hinged together along one side, and removably attached on the opposite side, upper and lower pairs of arcuate liners of insulating material having semi-circular inner faces disposed within the upper and lower parts, respectively, of said bearing body, electrical conductors for grounding said engine ignition system in case of shaft breakage attached to the inner faces of said liners, having radially extending connecting portions adapted to be connected to wires leading to ignition system grounding contacts, and a support for said bearing including an adjustable vertical standard, and an adjustable horizontal arm holding said bearing body around said shaft so that the inner surfaces of said insulating liners and the conductors thereon are concentric relative to said shaft out of contact therewith and spaced therefrom by an annular air gap.

References Cited in the file of this patent
UNITED STATES PATENTS

| | | |
|---|---|---|
| 449,411 | Hannah | Mar. 31, 1891 |
| 893,865 | Ormiston et al. | July 21, 1908 |
| 1,001,152 | Lawrence | Aug. 22, 1911 |
| 2,218,757 | Kuban | Oct. 22, 1940 |
| 2,435,343 | Downey | Feb. 3, 1948 |